United States Patent [19]

Dawson et al.

[11] Patent Number: 4,568,392

[45] Date of Patent: Feb. 4, 1986

[54] WELL TREATING FLUID

[75] Inventors: Charles R. Dawson, Houston, Tex.; Norman N. Li, Edison, N.J.; Dennis E. O'Brien, Houston, Tex.

[73] Assignees: Exxon Production Research Co., Houston, Tex.; Exxon Research & Engineering Co., Florham Park, N.J.

[21] Appl. No.: 483,394

[22] Filed: Apr. 8, 1983

Related U.S. Application Data

[60] Division of Ser. No. 389,349, Jun. 6, 1982, Pat. No. 4,337,354, which is a continuation of Ser. No. 79,978, Sep. 28, 1979, abandoned.

[51] Int. Cl.$^4$ ............................ C09K 3/00; C09K 7/00
[52] U.S. Cl. ................................ 106/900; 252/8.5 A; 252/8.512
[58] Field of Search ...................... 252/8.5 A, 8.5 LC; 166/294

[56] References Cited

U.S. PATENT DOCUMENTS

| Re. 27,888 | 1/1974  | Li et al. ........................ 208/308 |
|------------|---------|--------------------------------------------|
| 2,748,867  | 6/1956  | Lissant ......................... 166/309   |
| 2,775,557  | 12/1956 | Morgan ......................... 252/8.5 C  |
| 2,836,555  | 5/1958  | Armentrout ..................... 252/8.5 LC |
| 2,890,169  | 6/1959  | Prokop .......................... 252/8.5 D |
| 3,028,913  | 4/1962  | Armentrout ..................... 166/292    |
| 3,070,543  | 12/1962 | Scott ........................... 252/8.5 A |
| 3,081,260  | 3/1963  | Park ............................ 252/8.5 A |
| 3,082,823  | 3/1963  | Hower ........................... 166/294   |
| 3,145,774  | 8/1964  | Patchen ......................... 166/31    |
| 3,259,572  | 7/1966  | Dickson ......................... 252/8.5   |
| 3,323,603  | 6/1967  | Lummus et al. .................. 175/65    |
| 3,396,105  | 8/1968  | Burdyn .......................... 252/8.5 P |
| 3,407,878  | 10/1968 | Engle ........................... 166/294   |
| 3,420,299  | 1/1969  | Cloud ........................... 166/292   |
| 3,448,800  | 6/1969  | Parker et al. .................. 166/294   |
| 3,528,914  | 9/1970  | Darley .......................... 252/8.5   |
| 3,558,545  | 1/1971  | Lummus ......................... 260/29.6 H |
| 3,676,363  | 7/1972  | Mosier .......................... 252/316   |
| 3,713,915  | 1/1973  | Fast ............................ 149/91    |
| 3,816,308  | 6/1974  | Reed, Jr. ....................... 526/215   |
| 3,838,047  | 9/1974  | Le Blanc ....................... 260/29.6 H |
| 3,880,764  | 4/1975  | Donham .......................... 252/8.5   |
| 3,893,510  | 7/1975  | Elphingstone et al. ............ 166/295   |
| 3,949,560  | 4/1976  | Clem ............................ 405/264   |
| 3,958,638  | 5/1976  | Johnston ........................ 166/294   |
| 3,976,580  | 8/1976  | Kaminstein et al. ............... 252/2    |
| 3,985,659  | 10/1976 | Felicetta et al. ................ 252/8.5  |
| 4,036,301  | 7/1977  | Powers et al. .................. 166/293   |
| 4,040,967  | 8/1977  | Nimerick et al. ................ 252/8.55  |
| 4,128,528  | 12/1978 | Frisque et al. .................. 252/8.5 A |
| 4,173,999  | 11/1979 | Messenger ...................... 252/8.5 LC |
| 4,391,925  | 6/1982  | Mintz ........................... 252/8.5 B |
| 4,397,354  | 8/1983  | Dawson .......................... 166/294   |
| 4,445,576  | 5/1984  | Drake ........................... 166/294   |

FOREIGN PATENT DOCUMENTS

| 122647  | 10/1966 | Czechoslovakia . |
| 471637  | 9/1937  | United Kingdom . |
| 1265708 | 3/1972  | United Kingdom . |
| 2008171 | 5/1979  | United Kingdom . |

OTHER PUBLICATIONS

Chem Abstract 68:52,982v, 1968.

*Primary Examiner*—Theodore Morris
*Attorney, Agent, or Firm*—David H. Vickrey; Joseph J. Allocca

[57] ABSTRACT

The instant invention is directed to shear thickening fluids which comprise a water-swellable material (clay), present in a sufficient concentration so as to be capable of forming a stiff paste upon interaction with the water used, and water wherein the clay and water are kept separated by an intervening hydrocarbon-surfactant composition. The intervening oil phase prevents the interaction between the water and the clay phases and results in a stable, nonreacting, pumpable composite until such time as the oil envelope is ruptured by application of a sufficiently high shear force. Upon such rupture, the materials interact rapidly forming a semi-rigid stiff paste.

Various well-control problems, such as oil and gas with blowouts, can be controlled by use of the above-described composite. The composite is pumped down the well pipe. Exiting the orifices of the drill bit or a nozzle supplies the shear force needed to rupture the oil envelope thereby permitting the interaction between the clay and the water resulting in the formation of a stiff paste which can stop or prevent unwanted flow in or near the wellbore.

22 Claims, No Drawings

WELL TREATING FLUID

This application is a division of Ser. No. 06/389,349 filed 06/06/82 now U.S. Pat. No. 4,337,354, which is a continuation of Ser. No. 79,978 filed 09/28/79, now abandoned.

BRIEF DESCRIPTION OF THE INVENTION

The instant invention is directed to well treating fluids, particularly blowout control fluids, which are shear thickening fluids. The fluid composites comprise a water swellable material phase (clay for short) present in sufficient quantity so as to form a stiff paste upon interaction with the water used, which can constitute any of the known hydratable clays such as bentonite or attapulgite, a nonaqueous hydrophobic phase (oil for short) which comprises a hydrocarbonaceous component and a surfactant-strengthening agent component, and water which, when permitted to interact with the clay, results in a semi-rigid high strength paste.

In one particular embodiment, the clay is encapsulated in the oil phase and this encapsulated clay is suspended in the water resulting in a composite which is identified as a clay in oil in aqueous phase material, an aqueous continuous phase system.

Alternatively, the water can itself be encapsulated as discrete droplets in the oil phase whereby the oil phase becomes the continuous phase, the system being identified as an oil continuous system.

In either embodiment, the clay and the water are kept separate from each other by the intervening oil phase until such time as their interaction is desired. Such interaction is effected by rupturing the oil phase envelope by the application of a shear-force sufficient to rip apart the oil phase envelope and thereby mix the clay and water components.

In drilling operations, this fluid is pumped down the drill pipe only when necessary for the specific purpose of blocking unwanted flow channels either in or immediately adjacent to the wellbore. This material is not to be confused with typical well circulation-drilling fluids containing clay and water components.

The material of the instant invention is stable to the forces exerted upon it during pumping down the well pipe. Exiting the orifices of the drill bit, however, applies a sufficient force to rupture the oil envelope and mix the clay and water components in a semi-rigid, high strength gel capable of, for example, plugging a wellbore to stop a blowout or sealing a lost circulation zone.

A particular achievement of the instant invention is its ability to stop pre-existing unwanted flows provided that the paste is injected into the unwanted flow at an approximately high rate and provided that the unwanted flow is exiting through a flow channel long enough for a paste plug to be formed.

The exact placement of a paste plug in or near a wellbore will depend on the problem to be treated. For example, if unwanted fluid was entering the wellbore at the bottom and flowing uphole, the paste plug would be formed as close to the bottom of the hole as possible. On the other hand, if fluid was flowing downhole from and departing the wellbore undesirably into a thief formation, the composite would be pumped into the wellbore just above the thief zone so that the paste would be formed at the flow channels in that zone and plug them. Other possible uses of the present invention can also be envisioned, such as blocking channels in cement behind casing, repairing leaks in casing or tubing, placing temporary plug in various places, etc.

BACKGROUND OF THE INVENTION

During drilling, or production of an oil or gas well, there are occasionally unwanted fluid flows in or neear the wellbore, and there are also occasionally unwanted channels open downhole where unwanted flow could take place. On these occasions, it may be necessary to introduce fluids into the well to kill the well, or at the very least, terminate the unwanted flow or seal the unwanted channels. Examples of these problems are:

Unwanted influx of formation fluid into the wellbore (blowout).

Loss of drilling fluid into fractures or vugs in the formation (lost circulation).

Channels in cement behind casing.

Holes in casing.

Improperly sealing linear hangers.

A typical scenerio involves formation fluid influx which cannot be contained by closing the blowout preventers or by circulating the high density drilling mud. For example, when an unusually high pressure formation is encountered, it may be necessary to empty drilling mud at such high weight that a formation above the high pressure zone is fractured. This fractured zone then becomes a "lost zone" into which mud flows at such a high rate that "lost circulation" occurs. The lost circulation may be so severe that it ultimately becomes impossible to maintain a column of mud above the high pressure zone sufficient to impart the necessary hydrostatic head to offset the high pressures in the high pressure zone. As this occurs, the well becomes increasingly susceptible to blowout into the lost zone or to the surface.

There are a number of techniques which have been employed when one or another of these problems are encountered. a common solution is to force a cement slurry into the unwanted flow channel. This procedure is often successful, although sometimes multiple treatments are necessary, as long as there is no significant flow present in the unwanted channel. Cement is useless against a pre-established flow because cement has almost no flow resistance until it is set. Thus it is always necessary to stop the flow before using cement to plug the flow channel.

The hydrostatic head of various fluids is often employed to prevent or stop unwanted movement of fluids up the wellbore. In particular, most blowouts involve the uncontrolled flow of formation fluids into the wellbore and then upwards in the wellbore. This type of blowout can be controlled by injecting fluid at the proper density and rate into the wellbore at or near the point of influx. In practice, the required density and rate may be difficult to obtain.

One technique involves placing a high density barite slurry (barium sulfate) in the annulus adjacent the high pressure zone to provide the extra hydrostatic head needed to stop or prevent formation fluid influx. If the barite slurry remains deflocculated after placement at the bottom of the well and relatively undisturbed, the barite settles uniformly to form a hard plug. One problem with using barite to form a plug is that the barite's ability to form a plug varies greatly depending upon the formation temperature, the operating conditions, and the quality of barite used. For example, it is sometimes difficult to plug a well in the presence of a significant flow movement in the wellbore. If the fluid influx is not killed immediately by the hydrostatic head of the barite slurry, the settling barite will usually not stop the unwanted flow.

The unwanted loss of fluids from the wellbore is often treated by injecting a slurry of fiberous, lumpy, or flakey material into the wellbore at the region of the loss. These "lost circulation materials are intended to plug or form a mat over the channels through which the fluid is entering the rock.

A pasty material known as "gunk" is sometimes used as a lost circulation material and occasionally to form temporary plugs in the wellbore. Gunk is a slurry of dry powdered bentonite in diesel oil. A typical gunk recipe is 350 lb of bentonite in of bbl of diesel oil. This slurry is quite fluid when mixed and remains fluid as long as it is kept anhydrous. Mixing gunk slurry with an approximately equal volume of water cause the clay to hydrate into a stiff paste. If formed at the right time and at the right place, this gunk paste is an effective lost circulation and plugging material. However, since the gunk slurry will hydrate and thicken immediately upon contacting water, it must be kept dry until it has been pumped downhole to the place where a plug is desired. The mixing of the gunk slurry with water takes place downhole as the two fluids are commingled. In some cases, there is some control over the ratio of gunk slurry to water; in other cases, even this control cannot be achieved. Since gunk only achieves adequate flow resistance to form a plug within a certain range of gunk/water ratios, the performance of gunk as a plugging agent has been erratic. In particular, gunk is seldom useful for blowout control because the requirement of having the proper gunk/water ratio is difficult to satisfy.

DISCLOSURE

The composites of the instant invention solve a multitude of well control problems, in particular, the problems of thief zone control and blowout control or prevention. A low viscosity material, stable to pumping, is pumped down a well pipe and forced through the orifices of the drill bit or out a nozzle. Upon exiting the drill bit or nozzle or being subjected to any other perturbation sufficient to generate a high enough applied shear, the oil envelope separating the clay from the water is ruptured, permitting the clay and water to mix and set up into a high strength part at the point in the well at which such a paste is required.

The shear thickening well treating fluids of the instant invention are a multi-component composite comprising a water swellable material, present in sufficient quantity to react with the water used and set up into a high strength paste, (for the purposes of this specification, the term "clay" shall be employed) preferably a bentonite or attapulgite clay, which can broadly be described as any layered or chair configuration material which, in the presence of water, swells into a high viscosity solid mass; a hydrophobic phase comprising a hydrocarbonaceous component and a surfactant component and water, preferably fresh water, but any water is satisfactory so long as it does not contain any materials in a high enough concentration to interfere with the gelling of the water swellable material.

In general, the hydrophobic phase comprises a liquid oil, preferably any low aromatic content oil, typically mineral oil, paraffinic oils of from 6 to 1000 carbons (provided they are liquid at the temperature at which they are employed) motor oils such as diesel fuel or kerosene, substituted paraffinic oils wherein the substituents are selected from the group consisting of halogens, amines, sulfates, nitrates, carboxylates, hydroxyls, etc. Preferred oils are the $C_6$–$C_{200}$ liquid paraffin.

These hydrophobic nonaqueous materials are preferably mixed with oil soluble surfactants so as to enhance their hydrophobicity. A wide variety of surfactants can be used in the process of the instant invention. These surfactants include anionic, cationic, nonionic and ampholytic surfactants. These surfactants are described in the book *Surface Active Agents and Detergents* by Schwartz, Perry and Beich, Interscience Publishers, Inc., New York, N.Y.

The only requirement which must be met by the surfactant is that it be able to stabilize the water droplets and clay particles in the oil phase sufficiently to protect the mixture from premature gelling under low shear mixing conditions.

Anionic surfactants include carboxylic acids, i.e., fatty acids, resin acids, tall oil acids and acids from paraffin oxidation products. Also included among the anionic surfactants are alkyl sulfonates, alkylaryl sulfonates, mohogany and petroleum sulfonates, phosphates and lignin.

Cationic surfactants include quaternary ammonium compounds, e.g., salts of long chain primary, secondary and tertiary amines as well as quaternary amine salts with 7 to 40 carbon atoms. Styrene copolymers containing pendant quaternary ammonium groups including derivatives of trimethylamine or dimethylethanolamine are also useful cationic surfactants.

Unprotonated amines fall into the class of nonionic surfactants. A preferred group of amines have the general formula:

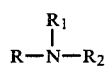

wherein R, $R_1$ and $R_2$ may be independently selected from the group consisting of hydrogen, $C_1$ to $C_{20}$ alkyl, $C_6$ to $C_{20}$ aryl and $C_7$ to $C_{20}$ alkylaryl radicals.

Various polyamine derivatives are useful within the scope of the instant invention. The preferred polyamine derivatives are those having the general formula:

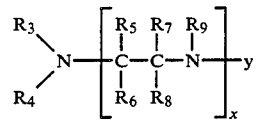

wherein $R_3$, $R_4$, $R_5$, $R_6$, $R_7$, $R_8$, $R_9$ and y are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof, and x is an integer of from 1 to 100. The substituted derivatives are preferably selected from the group consisting of oxygen, nitrogen, sulfur, phosphorus and halogen containing derivative. The most preferred material is:

In general, the preferred surfactants are the products obtained by the reaction of the polyamine described above with various polyalkyl succinic anhydrides, such as polybutenyl succinic anhydride, polypropenyl succinic an hydride and polyisobutenyl succinic anhydride.

A preferred polyamine derivative, formed by reacting together an alkyl succinic radical, and the polyamine has the general formula:

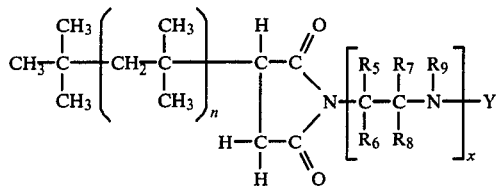

wherein n varies from 10 to 60, preferably 10 to 30, most preferably 15 ∝ 17, x varies from 1 to 100, preferably 3 to 10, $R_5$, $R_6$, $R_7$, $R_8$ and $R_9$ are hydrogen $C_1$ to $C_{20}$ alkyl, $C_6$ to $C_{20}$ aryl, $C_7$ to $C_{20}$ alkaryl radical and substituted derivatives thereof, preferably hydrogen and y is selected from the group consisting of hydrogen and oxygen containing hydrocarbyl radicals having up to 10 carbons, e.g., acetyl. Typically, the surfactants have a molecular weight on the order of about 1000.

Nonionic systems include the polyethenoxy surfactants, i.e., polyethoxy ethers of alkyl phenols, polyethoxy ethers of alcohols, etc. The polyethenoxy ethers are especially useful in the invention as their solubility may be varied according to the weight of ethylene oxide added to the alkyl phenol starting material. Another non-ionic surfactant which is particularly useful is sorbitan monnoleate which is known in the trade by the name of Span-80 and manufactured by the Atlas Chemical Company. Ampholytic surfactants contain both an acidic and a basic function in their structure and therefore will be cationic or anionic according to the pH of the solution in which they are dissolved.

The final component of the shear sensitive fluids of the instant invention is water, preferably fresh water, but as previously stated, any water may be employed so long as it does not contain any material or pollutant in high enough concentration to interfere with the gelling of the water swellable material.

The composite made up of the above recited ingredients can assume a number of physical conditions all of which are included within the scope of the instant invention and all of which will function as shear thickening fluids.

In one embodiment, the clay component will be encapsulated in the previously defined oil phase (hydrocarbonaceous component and surfactant) and this encapsulated clay will in turn be suspended in the water wherein the water will exist as the continuous phase.

In an alternative embodiment, the clay as discrete particles will be encapsulated in the oil phase while discrete droplets of water will also be encapsulated in the oil phase (the discrete clay particles and water droplets existing as separate entities, separated by the oil phase) which oil phase in this embodiment is the continuous phase.

In either embodiment, the clay and the water are kept separate until such time as their mixing is deliberately desired, and this is accomplished by subjecting the composite to a shear force, as by passage through the nozzle of a drill bit, of sufficient intensity to rupture the oil-phase envelope. Sufficient shear can also be generated by pumping the composite through the pipe at such a rate that a sufficient pressure drop is created to rupture the oil envelope.

In a preferred embodiment, the clay is a bentonite clay, the hydrocarbon oil is S100N, a $C_{30}$ paraffinic liquid oil, and the surfactant is chosen from the group of materials having formula corresponding to Compound A, previously defined.

Most preferably, polyamines of the formula $A_1$ or $A_2$ below are employed:

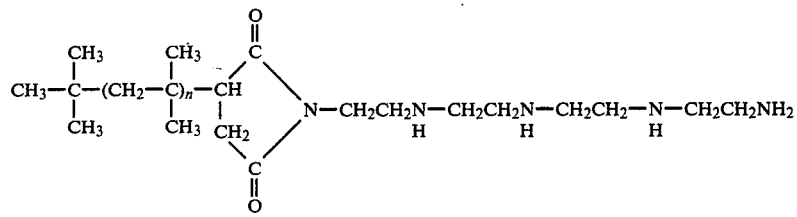

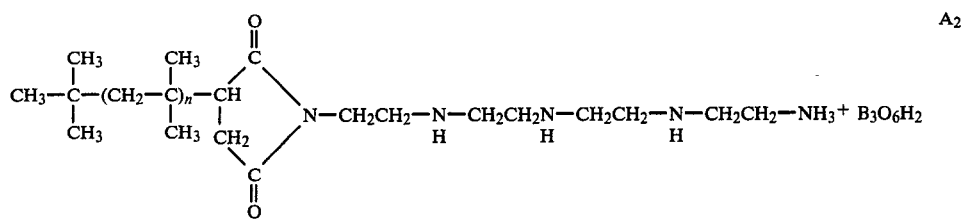

Polyamine $A_1$ is available as Paranox 100 from Exxon Chemical Co., while Polyamine $A_2$ is available as Paranox 106 from Exxon Chemical Co.

In addition, the composition may have included in it, either in the oil phase or in the water, preferably the oil phase, a fiberous material such as fiberglass, asbestos, wood fiber, cellulose, shreaded paper, cotton seed hulls, sugar cane bagasse, peanut shells, shreaded old tires, etc., which is substantially impervious to the action of the water and to the oil phase. These added materials serve the purpose of imparting increased mechanical strength and rigidity to the gel paste which sets up, upon rupture of the oil envelope, when the clay and water phases interact.

The shear thickening fluid may also have added to it materials such as barite, hematite, galena, ilmenite, etc., which are commonly used for increasing the density and drilling fluids. These weighting agents are not water-swellable and will not participate in the shear-thickening effect of the instant invention but would be added if higher density formulations were particularly desired. If used, the weighting agents will absorb some of the surfactant, especially if the agent is finely powdered.

With the one proviso that the clay and the water are never mixed before their introduction into the hydrocarbonaceous phase, the composites of the instant invention, whether water continuous or oil continuous, are prepared by mixing the components in any order. In general, the oil surfactant and clay are mixed together employing any convenient mixing apparatus. The clay can be added to premixed oil and surfactant, or clay can be added to the surfactant and then the oil added or vice-versa. Alternatively, the oil can be added to the clay and then the surfactant added, or the oil-surfactant combination can be added to the clay. Any technique is acceptable so long as the clay becomes encapsulated by the oil-surfactant phase.

The composite of the instant invention has its components present in the following ranges (expressed in parts by weight):

Clay 100
Water 150 to 400
Oil 50 to 150
Surfactant 5 to 50

The effectiveness of the liquid-membrane well control fluid is illustrated clearly in the following examples, summarized in Table I.

When 10% bentonite was mixed with 90% water, a thick gel was formed with a viscosity of 2200 cp. When bentonite was encapsulated by liquid membrane No. 1 (3% polyamine A, 97% S100N) and then mixed with water at a 1/9 ratio, the mixture had only a viscosity of 350 cp. When a second formulation was used for encapsulation of the bentonite clay particles (LM No. 2, 5% polyamine A 95% S100N), the viscosities of the mixture of the encapsulated bentonite and water (1/9 to 1/24 ratio encapsulated clay to water) were in the range of 4 to 5 cp, indicating that the encapsulation was indeed very effective and that the mixture was almost as fluid as water (viscosity of 1 cp) and therefore would be easily pumpable down the well. The last experiment shows that when the above mixture is subjected to a strong shear in a Waring blender similar to that as would be encountered upon being pumped through drilling bit nozzles, the membranes were ruptured, exposing the bentonite particles to the surrounding water, a thick gel was formed which had a viscosity of 2085 cp. In an actual operation, this would mean that the gel would be formed after the mixture was pumped through the drilling bit nozzles, which would presumably plug the well and prevent the flow of the unwanted fluids in or near the well bore or generate a paste at the precise location desired to seal off lost circulation zones or channels in cement behind casings or holes in casings or improperly sealed liner hangers, etc., in other words, generate a paste capable of effecting the desired control in the well.

TABLE 1
ENCAPSULATION OF BENTONITE
TO FORM A WELL CONTROL FLUID
Temperature = 25° C.

| | Viscosity* (cp) |
|---|---|
| 1. 10% bentonite dispersed in water | 2200 |
| 2. Bentonite encapsulated by LM No. 1 (poor encapsulation) mixed with water at 1/9 wt. ratio in a beaker with stirrer | 350 |
| 3. Bentonite encapsulated by LM No. 2 (good encapsulation) mixed with water at 1/9 wt. ratio in a beaker with stirrer | 5 |
| 4. Bentonite encapsulated by LM No. 2 (good encapsulation) mixed with water at 1/24 wt. ratio in a beaker with stirrer | 4 |
| 5. Bentonite encapsulated by LM No. 2 (good encapsulation) mixed with water at 1/9 wt. ratio in a Waring blender | 2085 |

LM No. 1: 3% Paranox 100 (polyamine), 97% S100N (isoparaffin C$_{35}$)
LM No. 2: 5% Paranox 100, 95% S100N
*Viscosities were measured in a Fann Viscometer Model 35 at 3 RPM bob spinning speed, 10 minutes after mixing was stopped.
Samples 2, 3, 4 and 5 contained 50 grams Bentonite in 75 grams of LM.

What is claimed is:

1. A heterogeneous well treating shear thickening composite comprising at least 10 weight percent of a water-swellable material capable of rapidly forming a high strength paste when mixed with water, an oil-surfactant phase and substantially polymer-free water wherein the water-swellable material, present in sufficient quantity so as to form a paste having a strength of at least 2000 lb/100 ft$^2$ and the water are kept separated by the intervening oil-surfactant phase until application of a shear force sufficient to cause mixing of the water-swellable material and the water.

2. The composite of claim 1 wherein the water swellable material is selected from the group consisting of montmorillonite clay and attapulgite clay.

3. The composite of claim 1 wherein the oil comprises mineral oil, C$_6$ to C$_{1000}$ paraffinic oil, motor oil or, substituted paraffinic oil wherein the substituents are selected from the group consisting of halogens, amines, sulfates, nitrates, carboxylates and hydroxyls.

4. The composite of claim 2 wherein the oil is a C$_6$ to C$_{200}$ liquid paraffin oil.

5. The composite of claim 1 wherein the water-swellable material is 100 parts by weight (pbw) of the composite, the water is 150 to 400 pbw of the composite, the oil is 50 to 150 pbw of the composite and the surfactant is 5 to 50 pbw of the composite.

6. The composite of claim 5 wherein the surfactant is the product obtained by the reaction of the polyamine

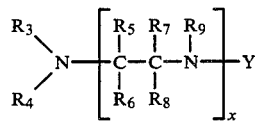

wherein R$_3$, R$_4$, R$_5$, R$_6$, R$_7$, R$_8$, R$_9$ and Y are chosen from the group consisting of hydrogen, C$_1$ to C$_{20}$ alkyl, C$_6$ to C$_{20}$ aryl, C$_7$ to C$_{20}$ alkaryl radicals and substituted derivatives thereof and x is an integer of from 1 to 100 with polyalkenyl succinic anhydrides, reaction proceding at the R$_3$, R$_4$ substituted nitrogen.

7. The composite of claim 6 wherein the polyalkenyl succinic anhydride is selected from the group consisting of polyisobutenyl succinic anhydride, polypropenyl succinic anhydride and polybutenyl succinic anhydride.

8. The composite of claim 6 wherein the surfactant is represented by the general formula:

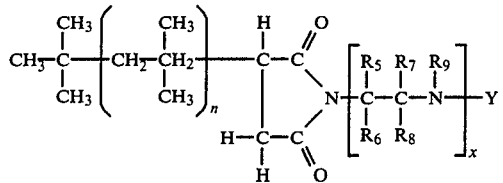

wherein n varies from 10 to 60, preferably 10 to 30, most preferably 15-17, x varies from 1 to 100, preferably 3 to 10, $R_5$, $R_6$, $R_7$, $R_8$ and $R_9$ are hydrogen, $C_1$ to $C_{20}$ alkyl, $C_6$ to $C_{20}$ aryl, $C_7$ to $C_{20}$ alkaryl radical and substituted derivative thereof, and Y is selected from the group consisting of hydrogen and oxygen containing hydrocarbyl radicals having up to 10 carbons.

9. The composite of claim 6 wherein the surfactant is represented by the formula:

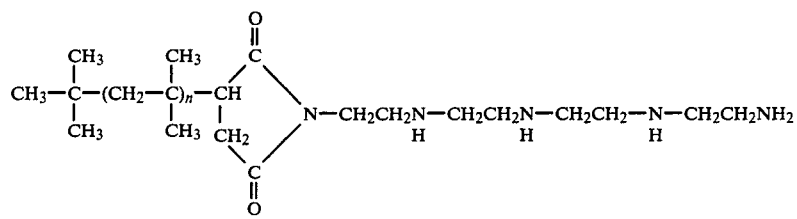

and

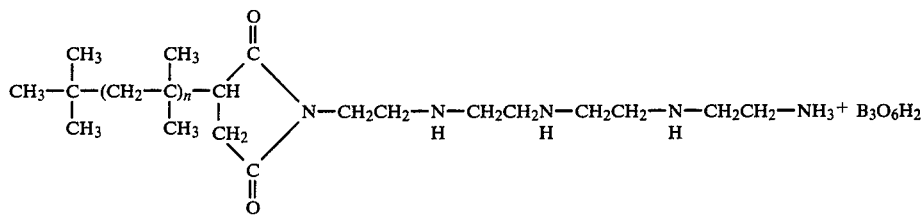

10. A well treating shear thickening composite stable to pumping comprising at least 10 weight percent of a water swellable material capable of rapidly forming a high strength paste when mixed with water, an oil-surfactant phase and substantially polymer-free water wherein the water-swellable material, present in sufficient quantity so as to form a paste having a strength of at least 2000 lb/100 ft², and the water are kept separated by the intervening oil-surfactant phase which phase remains intact until application of a shear force sufficient to cause mixing of the water-swellable material and the water.

11. The composite of claim 10 wherein the water swellable material is montmorillonite clay or attapulgite clay.

12. The composite of claim 10 wherein the oil comprises mineral oil, $C_6$ to $C_{1000}$ paraffinic oils, motor oil or, substituted paraffinic oil wherein the substituents are selected from the group consisting of halogens, amines, sulfates, nitrates, carboxylates and hydroxyls.

13. The composite of claim 11 wherein the oil is a $C_6$ to $C_{200}$ liquid paraffin oil.

14. The composite of claim 10 wherein the water-swellable material is 100 parts by weight (pbw) of the composite, the water is 150 to 400 pbw of the composite, the oil is 50 to 150 pbw of the composite and the surfactant is 5 to 50 pbw of the composite.

15. The composite of claim 14 wherein the surfactant is the product obtained by the reaction of the polymer

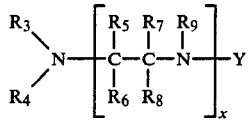

wherein $R_3$, $R_4$, $R_5$, $R_6$, $R_7$, $R_8$, $R_9$ and Y are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof and x is an integer of from 1 to 100 with polyalkenyl succinic anhydrides.

16. The composite of claim 15 wherein the polyalkenyl succinic anhydrides are selected from the group consisting of polyisobutenyl succinic anhydride, polypropenyl succinic anhydride and polybutenyl succinic anhydride.

17. The composite of claim 15 wherein the surfactant is represented by the general formula:

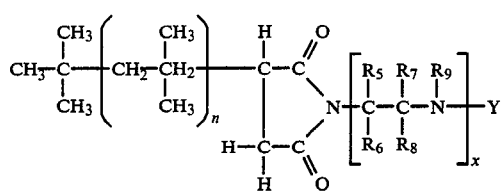

wherein n varies from 10 to 60, preferably 10 to 30, most preferably 15-17, x varies from 1 to 100, preferably 3 to 10, $R_5$, $R_6$, $R_7$, $R_8$ and $R_9$ are hydrogen $C_1$ to $C_{20}$ alkyl, $C_6$ to $C_{20}$ aryl, $C_7$ to $C_{20}$ alkaryl radical and substituted derivative thereof, and Y is selected from the group consisting of hydrogen and oxygen containing hydrocarbyl radicals having up to 10 carbons.

18. The composite of claim 15 wherein the surfactant is represented by the formula:

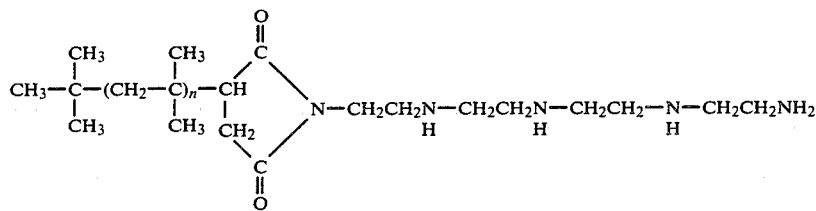

and

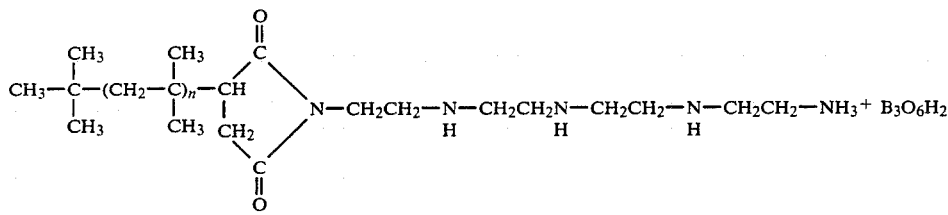

19. The composite of claim 5 wherein the clay is suspended in the oil-surfactant phase and this clay slurry is suspended in the water, the water being a continuous phase.

20. The composite of claim 5 wherein the clay is suspended in the oil surfactant phase as discrete particles and the water is also suspended in the oil-surfactant as discrete droplets, the oil-surfactant phase being a continuous phase.

21. The composite of claim 8 wherein the clay is suspended in the oil-surfactant phase yielding a slurry and this clay slurry is suspended in the water, the water being a continuous phase.

22. The composite of claim 8 wherein the clay is suspended in the oil-surfactant phase as discrete particles and the water is also suspended in the oil-surfactant phase as discrete particles, the oil-surfactant phase being a continuous phase.

* * * * *